(12) United States Patent
Bachhuber-Haller et al.

(10) Patent No.: US 8,286,194 B2
(45) Date of Patent: Oct. 9, 2012

(54) COUPLING STATE AWARE SYSTEMS

(75) Inventors: Christoph Bachhuber-Haller, Holzgerlingen (DE); Martin Henke, Reutlingen (DE); Monika Illgner-Kurz, Herrenberg (DE); Georg Ochs, Moetzingen (DE); Bernhard Schmid, Sindelfingen (DE); Thomas Spatzier, Sindelfingen (DE); Jeremias Werner, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/273,802

(22) Filed: Nov. 19, 2008

(65) Prior Publication Data
US 2010/0125624 A1 May 20, 2010

(51) Int. Cl.
*G06F 3/00* (2006.01)
*G06F 9/44* (2006.01)
*G06F 9/46* (2006.01)
*G06F 13/00* (2006.01)

(52) U.S. Cl. .......................... 719/319; 719/320
(58) Field of Classification Search .................. 719/313, 719/318, 320
See application file for complete search history.

(56) References Cited

U.S. PATENT DOCUMENTS

| | | | | |
|---|---|---|---|---|
| 6,901,596 B1 * | 5/2005 | Galloway | ....................... | 719/330 |
| 7,051,335 B2 * | 5/2006 | Gehring et al. | ............... | 719/315 |
| 7,363,342 B1 * | 4/2008 | Wang et al. | .................... | 709/204 |
| 7,930,702 B2 * | 4/2011 | Xie et al. | ....................... | 719/315 |
| 2007/0162560 A1 * | 7/2007 | Jin | ................................. | 709/217 |
| 2007/0234371 A1 * | 10/2007 | Upton | ........................... | 719/320 |

FOREIGN PATENT DOCUMENTS
WO  WO01/65815 A2  7/2001
WO  WO01/65815 A3  7/2001

OTHER PUBLICATIONS

Qian et al, Asynchronous Callback in Web Services, IEEE, 2006, 4 pages.*
Fallah et al, An Event-Driven Pattern for Asynchronous Invocation in Distributed Systems, International Journal of Computer Science and Network Security, vol. 7, No. 4, 2007, pp. 189-194.*
Zhun et al, Design and Implementation of an Asynchronous Invocation Framework for Web Services, Springer-Verlag Berlin Heidelberg, 2003, pp. 64-78.*

* cited by examiner

*Primary Examiner* — Diem Cao
(74) *Attorney, Agent, or Firm* — Cantor Colburn LLP; Randall Bluestone

(57) ABSTRACT

A method of coupling asynchronous process interaction between computer systems integrated within an overall system of interconnected systems includes receiving a set of information describing an invocation call for execution of a first process on a first system integrated within the overall system; correlating a first callback argument received upon completion of the first process that includes a first unique identifier for the first process generated by the first system with the set of information according to the first unique identifier for the first process; and sending a notification message to a callback endpoint in a second process implemented to receive notification upon completion of the first process by the first system indicating completion of the first process. The second process executing on a second system integrated within the overall system makes the invocation call. The set of information specifies the first unique identifier and the callback endpoint.

17 Claims, 6 Drawing Sheets

COUPLING STATE AWARE SYSTEMS

BACKGROUND

Exemplary embodiments of the present invention relate to systems of interconnected computer systems, and more particularly, to asynchronous process interaction between computer systems integrated within an overall system of interconnected systems.

In information technology (IT) systems that integrate multiple interconnected, heterogeneous software systems in which the executing process flows and tasks for each individual system are interrelated with the internal state of the overall system, the interconnected systems have a need to interact with one another. In one aspect of interaction between the interconnected systems, the internal states for the processes being executed by the different system are dependent on process flows and tasks executing throughout the overall system (that is, the internal state for a process being executed by one of the interconnected systems can change as a result of the execution of process flows and tasks on other systems interconnected within the overall system). In another aspect, the execution of process flows and tasks by the interconnected systems is dependent on the state of the overall system (for example, a dependency where a system must be in a certain state for a process flow to continue). Nevertheless, each of the interconnected systems integrated within the overall system may have its own particular implementation for state handling, inter-process communication, and synchronous and asynchronous job execution. As a result, interfaces must be implemented to provide for communication between the systems, for example, where two systems need to communicate with one another to track the progress of external states, to wait for the end of external tasks to synchronize their own processing, or to be notified by event messages transmitted by external tasks upon a state change.

One common IT architectural implementation for systems of multiple, interconnected computer systems that has been increasing in importance recently provides for the systems to be integrated so as to contribute to a higher-level business flow. In systems implemented according to this architecture, the execution can be described according to the client-server model of computer process interaction. More particularly, a high-level process flow is executed by a control flow system (the client system), and the individual stages of the high-level process flow are performed by other individual systems (the server systems) integrated within the overall system. In particular, at various points during execution of the high-level process flow, the control flow client system will invoke another of the interconnected systems to execute the actual functionality for the concrete operations performed during a certain stage in the high-level process flow. The operations performed during a certain stage in the high-level process flow by the invoked system may involve an isolated, primitive task, or the invoked system may operate in a manner similar to the control flow client system to direct execution of a complex process flow in which the system directing the complex process flow (now viewed as the client system) will invoke another of the interconnected systems as a server system to execute the actual functionality for the concrete operations performed during a certain stage in the complex process flow. In this manner, the high-level business process flow performed by the overall system integrating the heterogeneous systems can be executed using a nested chain of interconnected systems executing higher-level functionality to act as client systems to systems that act as server systems to provide lower-level functionality.

In existing implementations of such integrated systems, the needed interconnections between the individual systems are provided for using a synchronous messaging pattern (for example, the control flow execution directed by the client system "waits" for each call made to another system to return before continuing to execute). The correlation between the combined flows performed in the individual stages as described above is performed unique task identifiers such as IDs, tickets, etc. For example, when a system directing a control flow acts as a client to invoke another system as a server to execute some task, the server system may return a ticket that identifies the specific instance of the invoked process being executed, and the client then waits for the specific process instance identified by the returned ticket to complete. Where the interconnected systems in such a system are homogeneous (same type, same vendor, etc.), the coupling and correlation of the interrelated tasks and flows provided by each interacting system can be performed quite easily because the homogeneous systems will generally use the same mechanisms for identifying tasks or for notifying one another. This is particularly true where the combined flows are executed within a single system.

The coupling and correlation in an implementation providing a heterogeneous system of interconnected systems, however, imposes implementation challenges because the mechanisms of task identification and notification differ among interacting systems. With respect to task identification, it will often be the case that completely different information domains are used for identifying tasks by the different integrated systems. Domains of different interconnected systems are not trivial to correlate. In particular, with respect to notification mechanisms, it is a challenge to couple the communication channels used by the systems to one another because they may rely on different, incompatible protocols for communication. In certain situations, for example, the callback protocols offered by a system acting as a server may be different from those understood by the calling system acting as the client. In other situations, a system called as a server may not even be configured to provide any notification mechanisms, in which case the systems acting as clients must actively poll the server system for task completion. Situations such as these can involve a large overhead cost for developing the binding implementation.

SUMMARY

An exemplary embodiment of a method of coupling asynchronous process interaction between computer systems integrated within an overall system of interconnected systems includes receiving a set of information describing an invocation call for execution of a first process on a first system integrated within the overall system; correlating a first callback argument received upon completion of the first process that includes a first unique identifier for the first process generated by the first system with the set of information according to the first unique identifier for the first process; and sending a notification message to a callback endpoint in a second process implemented to receive notification upon completion of the first process by the first system indicating completion of the first process. The second process executing on a second system integrated within the overall system makes the invocation call. The set of information specifies the first unique identifier and the callback endpoint.

Exemplary embodiments of the present invention that are related to computer program products and data processing systems corresponding to the above-summarized method are also described and claimed herein.

Additional features and advantages are realized through the techniques of the present invention. Other exemplary embodiments and aspects of the present invention are described in detail herein and are considered a part of the claimed invention. For a better understanding of the present invention with advantages and features, refer to the description and to the drawings.

BRIEF DESCRIPTION OF THE SEVERAL VIEWS OF THE DRAWINGS

The subject matter that is regarded as the present invention is particularly pointed out and distinctly claimed in the claims at the conclusion of the specification. The foregoing and other objects, features, and advantages of the various embodiments of the present invention are apparent from the following detailed description of exemplary embodiments taken in conjunction with the accompanying drawings in which:

Figure 1:
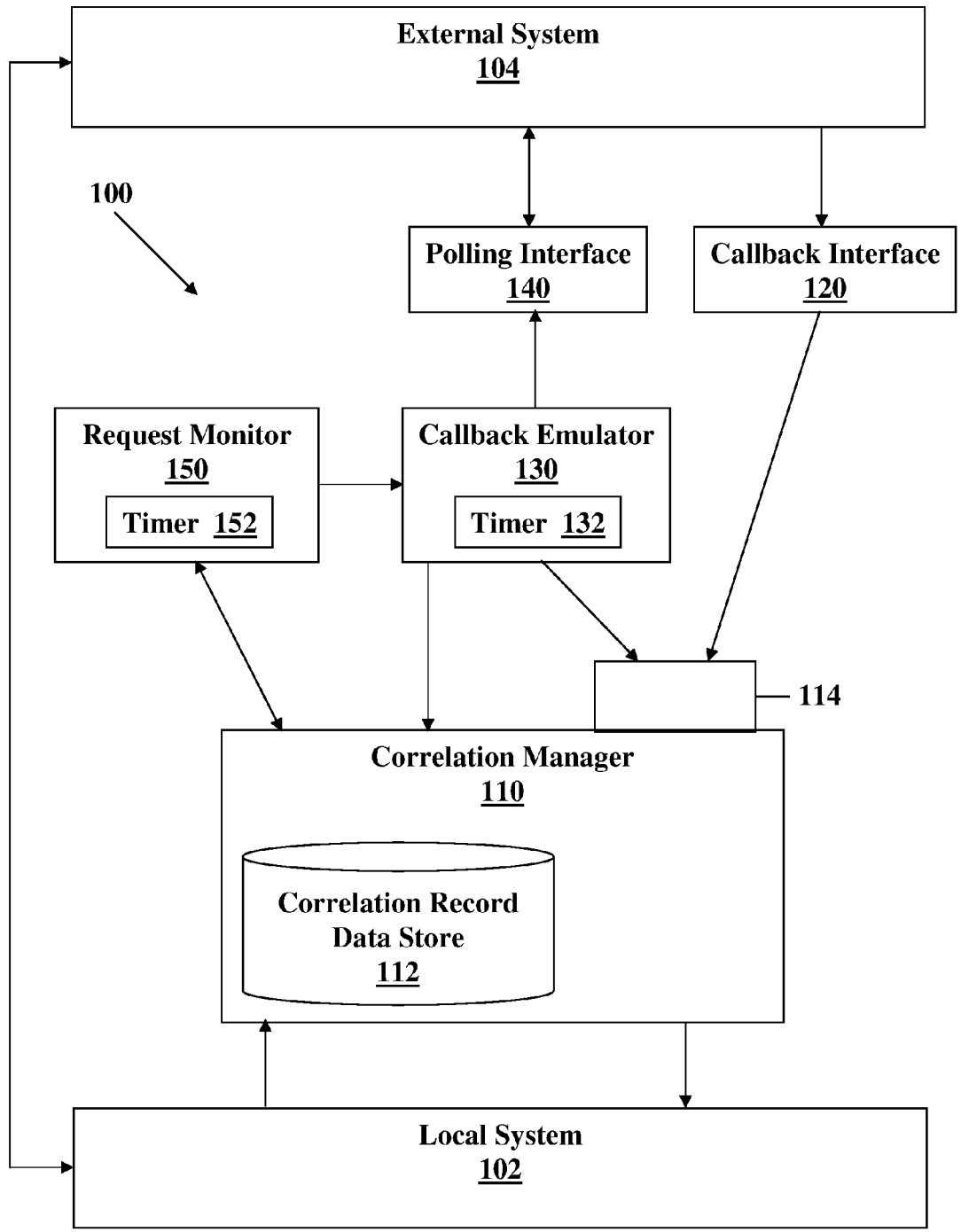
FIG. 1 is a block diagram illustrating an exemplary embodiment of a coupling mechanism configured to perform coupling of interrelated tasks and process flows executed by multiple interconnected, heterogeneous computer systems integrated within an overall IT system.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the present invention. For instance, the steps may be performed in a differing order, or steps may be added, deleted, or modified. All of these variations are considered a part of the claimed invention.

DETAILED DESCRIPTION

While the specification concludes with claims defining the features of the present invention that are regarded as novel, exemplary will be better understood from a consideration of the detailed description in conjunction with the drawings. It is of course to be understood that the embodiments described herein are merely exemplary, which can be embodied in various forms. Therefore, specific structural and functional details disclosed in relation to the exemplary embodiments described herein are not to be interpreted as limiting, but merely as a representative basis for teaching one skilled in the art to variously employ embodiments in virtually any appropriate form, as well as any suitable modifications that may be made to these embodiments. Further, the terms and phrases used herein are not intended to be limiting but rather to provide an understandable description of the present invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof.

Exemplary embodiments of the present invention can be implemented to provide an asynchronous coupling mechanism for performing translation of messages required for correlating process and flow states in state-aware systems of multiple, interconnected computer systems. Exemplary embodiments can be implemented to provide a resource that can be incorporated within such a system of interconnected systems as messaging middleware to enable heterogeneous systems integrated within the system to couple with one another by providing for correlation between the internal and external process and flow states, thereby providing increased interoperability, portability, and flexibility for the system.

Exemplary embodiments of the present invention as will be described herein can be implemented using one or more program modules and data storage units. As used herein, the term "modules", "program modules", "components", "systems", "tools", "utilities", and the like include routines, programs, objects, components, data structures, and instructions, or instructions sets, and so forth that perform particular tasks or implement particular abstract data types. As can be appreciated, the modules refer to computer-related entities that can be implemented as software, hardware, firmware and/or other suitable components that provide the described functionality, and which may be loaded into memory of a machine embodying an exemplary embodiment of the present invention. Aspects of the modules may be written in a variety of programming languages, such as C, C++, Java, etc. As used herein, the terms "data storage unit," "data store", "storage unit", and the like can refer to any suitable memory device that may be used for storing data, including manual files, machine readable files, and databases. The functionality provided by exemplary embodiments can be combined and/or further partitioned. The modules and/or storage units can all be implemented and run on the same computing system (for example, the exemplary computer system illustrated in FIG. 6 and described below) or they can be implemented and run on different computing systems. For example, one or modules can be implemented on a personal computer operated by a user while other modules can be implemented on a remote server and accessed via a network.

Referring now to FIG. 1, a block diagram illustrating an exemplary embodiment of a coupling mechanism 100 configured to perform coupling and correlation of the interrelated tasks and flows executed by multiple interconnected, heterogeneous computing systems integrated within an overall IT system is provided. In the present exemplary embodiment, the system within which coupling mechanism 100 is incorporated includes a local system 102 and an external system 104. In FIG. 1, local system 102 is depicted acting as a client system to invoke external system 104 as a server system to execute the actual functionality for the concrete operations performed during a certain stage in a process flow being directed by the client system. Coupling system 100 is implemented as an autonomous messaging middleware mechanism that interacts with both portions of client/server model. Coupling system 100 supports an asynchronous pattern of interaction between the interconnected systems of the system within which coupling mechanism 100 is incorporated. For example, in FIG. 1, a process flow executing on local system 102 will invoke tasks to be executed external system 104 in an asynchronous manner. That is, the invocation call is returned immediately by external system 104 to local system 102, and the call return provides neither any indication of the result of the task performed by the external system nor any indication that the external system has completed executing the task at all. Rather, local system 102 puts the invoking process flow on hold (that is, in a 'wait' state) and waits to receive a callback argument sent from external system indicating that the requested task has completed. Upon such notification that external system 104 has completed execution of the requested task, local system 102 can then continue executing its respective process flow.

Of course, it should be noted that FIG. 1 is provided for illustrative purposes only, and that, in exemplary embodiments, coupling mechanism 100 can be configured for incorporation within many different variations of IT systems that may include any number of multiple interconnected, heterogeneous computing systems for which the interaction between the interconnected systems can be described according to the client-server model of computer process interaction to provide a resource for coupling the interconnected systems by allowing for correlation between the internal and external process and flow states. For instance, in exemplary embodiments, coupling mechanism 100 could be incorporated within a system that includes a control flow system configured to direct a high-level process flow in which other individual systems incorporated within the overall system are invoked by the control flow system to execute the individual stages of the high-level process flow. Furthermore, in such exemplary embodiments, the operations executed by particular interconnected systems invoked by the control flow system during a certain stage in the high-level process flow may involve execution of an isolated, primitive task, or the invoked system may operate in a manner similar to the high-level flow control system to direct execution of a complex process flow in which, at various points during execution, the system directing the complex process flow will invoke another of the interconnected systems to provide the actual functionality for the concrete operations performed during a certain stage in the complex process flow. In exemplary embodiments, the system within which coupling mechanism 100 is incorporated can be a distributed computing system integrating a combination of interconnected application servers and software components. For instance, in exemplary embodiments, coupling system 100 can be configured for implementation within an enterprise service bus incorporated within a system designed according to a service-oriented architecture.

As depicted in FIG. 1, exemplary coupling mechanism 100 includes a correlation-managing module 110, a pluggable callback interface 120, a callback-emulating module 130, a pluggable polling interface 140, and a request-monitoring module 150. Correlation manager 110 is configured to correlate callback arguments from each process invoked on an interconnected system (the server system for the invoked process) by an originating process call made from another interconnected system (the client system for the invoked process) by storing a corresponding event correlation record for the invoked process that includes callback metadata in a correlation record data store 112 and then mapping the incoming callback argument to the correlation event. Correlation manager is implemented to provide interfaces for adding, modifying and deleting event correlation records. Callback interface 120 is configured to provide a mechanism for translating the callback arguments passed from the server systems executing the invoked process into a common protocol for use in correlating the state of the invoked process with the event correlation record for the invoked process (that is, the callback interface provides for technical compatibility). Callback emulator 130 is configured to periodically poll the states the processes being executed by the interconnected systems at a constant time interval and to use the information gathered during polling to emulate callback arguments for server systems that are not implemented to send them. Polling interface 140 is employed when callback emulator 130 is performing a periodic poll of the processes being executed by the interconnected system to call the particular interface methods implemented by each interconnected system. Request monitor 150 is configured to periodically access correlation manager 110 to perform a scan of the event correlation records maintained in correlation record data store 112 to identify callback arguments indicated as being lost, and configured to employ callback emulator 130 to request the appropriate state of the calls from the underlying systems to handle lost callback arguments.

In the present exemplary embodiment, callback interface 120 is pluggable according to the interfaces implemented for communication by each interconnected system, and polling interface 140 is pluggable according to the interfaces implemented by each interconnected system for providing state information. That is, callback interface 120 and polling interface 140 are implemented with the ability to interact with heterogeneous, interconnected systems through plug-in handlers each configured according to the protocols of a particular type of interconnected system. This affords developers with the ability to easily adapt coupling system 100 by implementing new or custom protocol schemes according to the different types of interconnected systems of the overall system within which the coupling system is incorporated.

Correlation manager 110 is configured to register with each interconnected system of the overall system within which exemplary coupling mechanism 100 is incorporated to receive information from each system on tasks or processes invoked by that system and the invoking processes, as well as callback arguments received from each system executing an invoked process. The information received from each system for each process invoked by that system includes a unique identifier generated for the invoked process generated by the server system executing the invoked process and a callback endpoint in the invoking process being executed by the client. The callback endpoint is implemented within the invoking process to receive notification upon completion of the invoked process by the server system. The callback arguments passed from the invoked server systems are received by callback interface 120. Correlation manager 110 is further configured to store the information describing the interrelated states of pairs of interacting systems, which may be heterogeneous, acting in client and server roles to one another in the overall system within which the coupling mechanism is incorporated, and to use this information to correlate the callback arguments from the invoked systems acting as servers to the invoking systems acting as clients. The information utilized by correlation manager 110 to correlate callback arguments to the originating process calls can include unique identifiers for the invoked processes provided by the systems acting in the role of servers. These unique identifiers can be included as callback metadata in the event correlation record stored in correlation record data store 112 by correlation manager 110 for each invoked process. Correlation manager 110 is further configured to perform cleanup of correlation record data store 112 to delete old or expired event correlation records.

Because "call before wait" situations, which occur where an invoked process provides a callback argument for an invocation call before correlation manager 110 has stored a corresponding event correlation record for the invocation call in correlation record data store 112, can arise, the correlation manager stores each incoming callback argument it receives in a callback queue 114. Thus, each incoming callback argument is made persistent in callback queue 114, which provides an asynchronous communication mechanism. Callback queue 114 can be implemented to provide enhanced resilience functionality to ensure that callback arguments are not lost, for example, in the event of a system failure.

Upon storing an event correlation record for an invoked process in correlation record data store 112, correlation manager 110 steps through the callback arguments stored in callback queue 114 to attempt to identify a callback argument that corresponds to the inserted event correlation record. If correlation manager 110 locates such a corresponding callback argument in callback queue 114, the correlation manager processes this callback argument in the same manner as if the callback argument had been sent after storing the event correlation record corresponding to the invoked process in correlation record data store 112. As a result, correlation manager 110 is configured to avoid problems caused by lost callback arguments in "call before wait" situations.

In the present exemplary embodiment, upon local system 102 making an asynchronous call invoking external system 104 to execute a particular task, the local system receives a reply message from the external system that contains a unique identifier for the requested task and transfers this unique identifier to correlation manager 110. Upon receiving this information, correlation manager 110 creates an event correlation record that includes the unique identifier for the task provided by external system 104 in a set of callback metadata for the invoked task. Correlation manager 110 then determines whether a callback argument for the invoked task has already been received by attempting to locate a callback argument identified by the unique identifier provided by external system 104 for the invoked task by analyzing callback queue 114. If a callback argument for the requested task is located in callback queue 114, correlation manager 110 notifies the registered end point specified in the event correlation record for the requested task and discards the event correlation record for the requested task. If a callback argument for the requested task is not located in callback queue 114, correlation manager 110 stores the event correlation record in correlation record data store 112. Upon the arrival of callback arguments for the invoked task in callback queue 114 (transmitted from either external system 104 or callback emulator 130, as will be described), correlation manager 110 is configured to perform a scan of correlation record data store 112 for the event correlation record waiting on the received callback arguments and transfer a notification message to the registered end point specified as waiting for the callback in the event correlation record corresponding to the received callback argument. If no event correlation record for an invoked task is located in correlation record data store 112 that corresponds to the callback argument, the callback argument is added to callback queue 114.

In exemplary coupling mechanism 100, callback emulator 130 is configured to periodically poll the states of processes being executed by the interconnected systems at a constant time interval and to use the information gathered by during polling to provide state information to correlation manager 110. The frequency of the periodic polling performed by callback emulator 130 is controlled by a timer 132 and is configurable according to the invoked tasks being monitored. Because some systems integrated within the system within which coupling mechanism 100 is incorporated may not be implemented to send callback events to correlation manager 110, callback emulator 130 is configured to emulate callback arguments provided for processes invoked on systems that are not capable of sending them. That is, where a system acting in the role of a server provides an interface that allows for the current execution state of the system to be supplied, callback emulator 130 can periodically call the interface of the system to obtain the execution state information for a particular task, construct an emulation of a callback argument from the system for task upon recognizing an indication that the task has completed in the current execution state information provided by the system, and provide the emulated callback argument to correlation manager 110 by adding the emulated callback argument to callback queue 114. Callback emulator 130 is configured to be adapted to the particular interface methods implemented by each system integrated within the system within which coupling mechanism 100 is incorporated, and the callback emulator utilizes the metadata identifier provided by the systems executing the invoked process to identify the particular tasks for each emulated callback argument the callback emulator provides to correlation manager 110. In this manner, from the perspective of correlation manager 110 within coupling mechanism 100, callback emulator 130 is viewed as acting like the server system to transfer the callback argument to the correlation manager, and, upon receiving an emulated callback argument from the callback emulator, the correlation manager makes these emulated callback arguments persistent by adding them to callback queue 114 in the same manner as when collecting the actual callback arguments received from the systems that are implemented to provide callback arguments. Callback emulator 130 is thereby transparent to correlation manager 110.

In state-aware systems of multiple, interconnected computing systems within which coupling mechanism 100 is configured to be incorporated, a callback argument sent from a system acting a server to perform a particular task requested by an invocation call from a system acting as a client are sometimes lost due to, for example, network problems or system outages. Request monitor 150 is implemented to aid the system within which coupling mechanism 100 is incorporated in recovering from these situations. More particularly, request monitor 150 is controlled by a timer 152 to periodically access correlation manager 110 to perform a scan of the event correlation records in correlation record data store 112 to identify callback arguments indicated as being lost. When a system acting as a client invokes another system to perform a particular task, the upper time limit within which the task is normally expected to have been completed (that is, the upper time limit provided in a timeout event as configured by the developer according to expectations regarding the requested task) is provided by the invoked system. Where the time period for this upper time limit has expired for a requested task having a corresponding event correlation record in correlation record data store 112 for which a callback argument has not been received, request monitor 150 is configured to identify the callback argument corresponding to event correlation record as being lost. Request monitor 150 is configured to recover from identified lost callback arguments by employing callback emulator 130 to call the appropriate interface method to request the appropriate state of the tasks requested by the originating calls from the underlying systems that correspond to the lost callback arguments.

Figure 2:
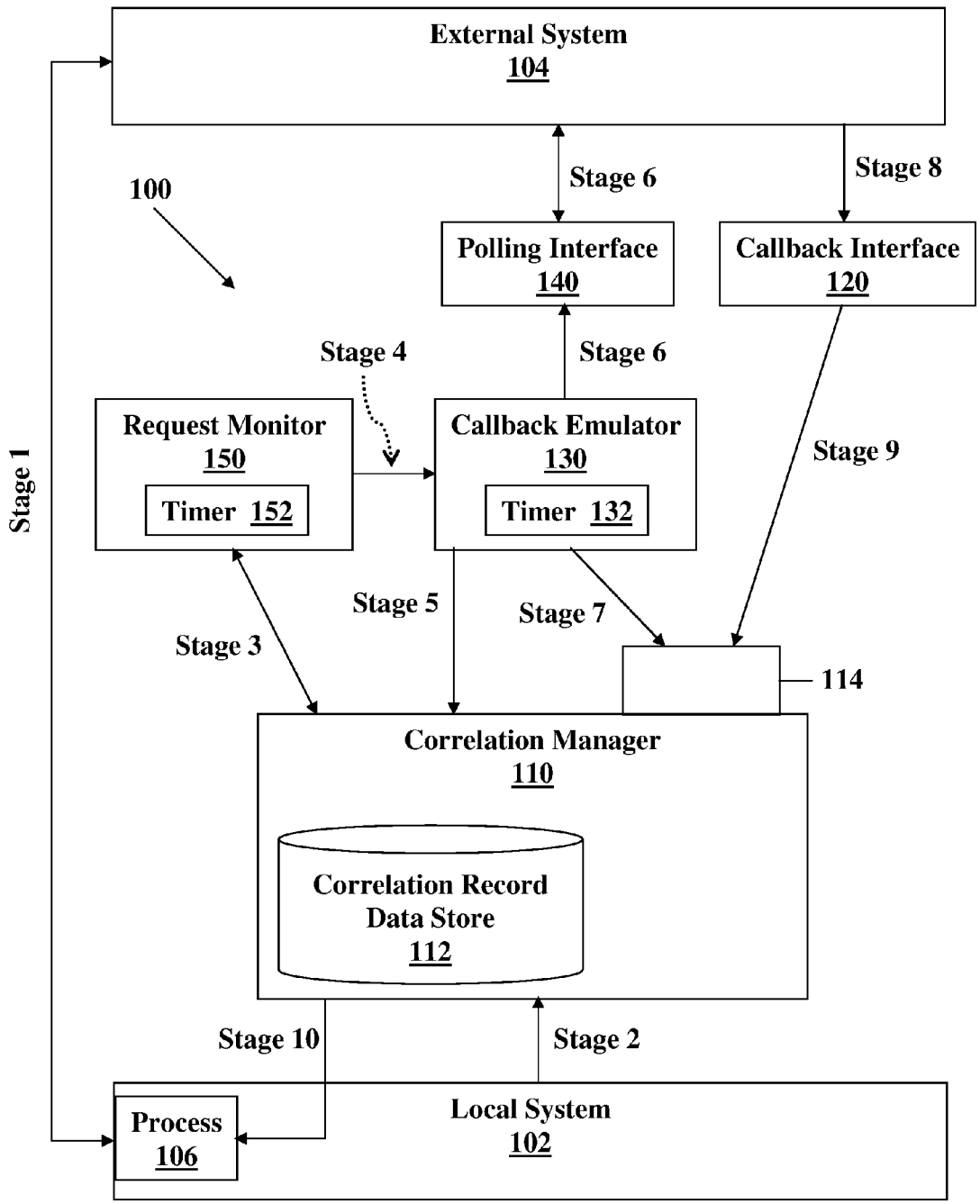
FIG. 2 is a block diagram illustrating an example workflow performed by exemplary coupling mechanism of FIG. 1 in handling the interaction flow between a local system acting as the invoking client and an external system acting as the invoked server.

Referring now to FIG. 2, an example of the workflow performed by exemplary coupling mechanism 100 in handling the interaction flow between local system 102, acting as the invoking client, and external system 104, acting as the invoked server, is illustrated. At stage 1 in the present example workflow, a process 106 executing on local system 102 transmits an asynchronous invocation call requesting external system 104 to execute a desired task, and, upon receiving the invocation call from local system 102, and external system 104 sends an immediate reply message indicating that execution of the requested task is being initiated by the external system. The reply message includes the unique process identifier generated for the task by external system 104 and is received by process 106 on local system 102. At stage 2, local system 102 sends a message to correlation manager 110 requesting creation of an event correlation record corresponding to the requested process. The request message may include, for example, the unique process identifier generated for the task by external system 104, the state of execution for the task (for example, the state of the entry is set to 'STARTED'), and the name or other identification of the external system. After sending the request message to correlation manager 110, process 106 will then wait until receiving notification that external system 104 has completed execution of the requested task.

At stage 3 in the example workflow depicted in FIG. 2, request monitor 150 periodically accesses correlation manager 110 to perform a scan of the information in correlation record data store 112 to identify callback arguments indicated as being lost. At stage 4, for each lost callback identified at stage 3, request monitor 150 triggers callback emulator 130 to request the appropriate state of the calls from the called systems (for example, external system 104) to handle lost callback arguments.

At stage 5, callback emulator 130 periodically accesses correlation manager 110 to perform a scan of correlation record data store 112 to identify each requested task within the overall system that requires the particular system executing the task to be polled for the state of the task. More specifically, callback emulator 130 identifies each event correlation record in correlation record data store 112 for which a corresponding callback argument has not yet been received from the process corresponding to the event correlation record (for example, callback emulator 130 may be configured to identify each event correlation record for which the current state of execution for the corresponding task is indicated as having the state 'STARTED'). Following each periodic scan of correlation record data store 112, callback emulator 130 is configured to poll each particular system executing a process corresponding to an event correlation record identified at stage 5 for the state of the process. A timer 132 controls the frequency of the periodic scanning of correlation record data store 112 and polling performed by callback emulator. For example, at stage 6 in FIG. 2, callback emulator 130 employs polling interface 140 to call the 'getState' method provided by external system 104 to poll the state of execution of the task invoked by the request from process 106 at stage 1. The 'getState' interface method may be implemented, for example, to receive the unique process identifier for the task invoked by process 106 and to return the current state of the corresponding process instance. If the response from external system 104 to the 'getState' interface method indicates that the task invoked by the request from process 106 has completed, callback emulator 130, at stage 7, creates an emulation of the callback arguments expected from external system 104 and adds the emulated callback argument to the callback queue.

Alternatively, where external system 104 is configured with a mechanism to provide callback arguments, upon completion of execution of the process requested by process 106 on the external system, callback interface 120, at stage 8, receives the callback argument send from the external system for the completed process. Callback interface 120 is configured to translate the callback arguments passed from systems executing invoked processes into a protocol understood by the invoking systems. At stage 9, callback interface 120 transmits the callback argument to callback queue 114. Correlation manager 110 then correlates this callback to the corresponding event correlation record in correlation record data store 112 and updates the event correlation record corresponding to the completed task in correlation record data store 112 (for example, the state for the entry is modified to 'FINISHED'). Upon the event correlation record corresponding to the task requested by process 106 being updated to indicate that the task has completed (either at stage 7 or stage 9 in the example operation depicted in FIG. 2), correlation manager 110, at stage 10, sends a wait complete event message to process 106. Upon receiving the wait complete event message from correlation manager 110, local system resumes section of process 106.

Figure 3:
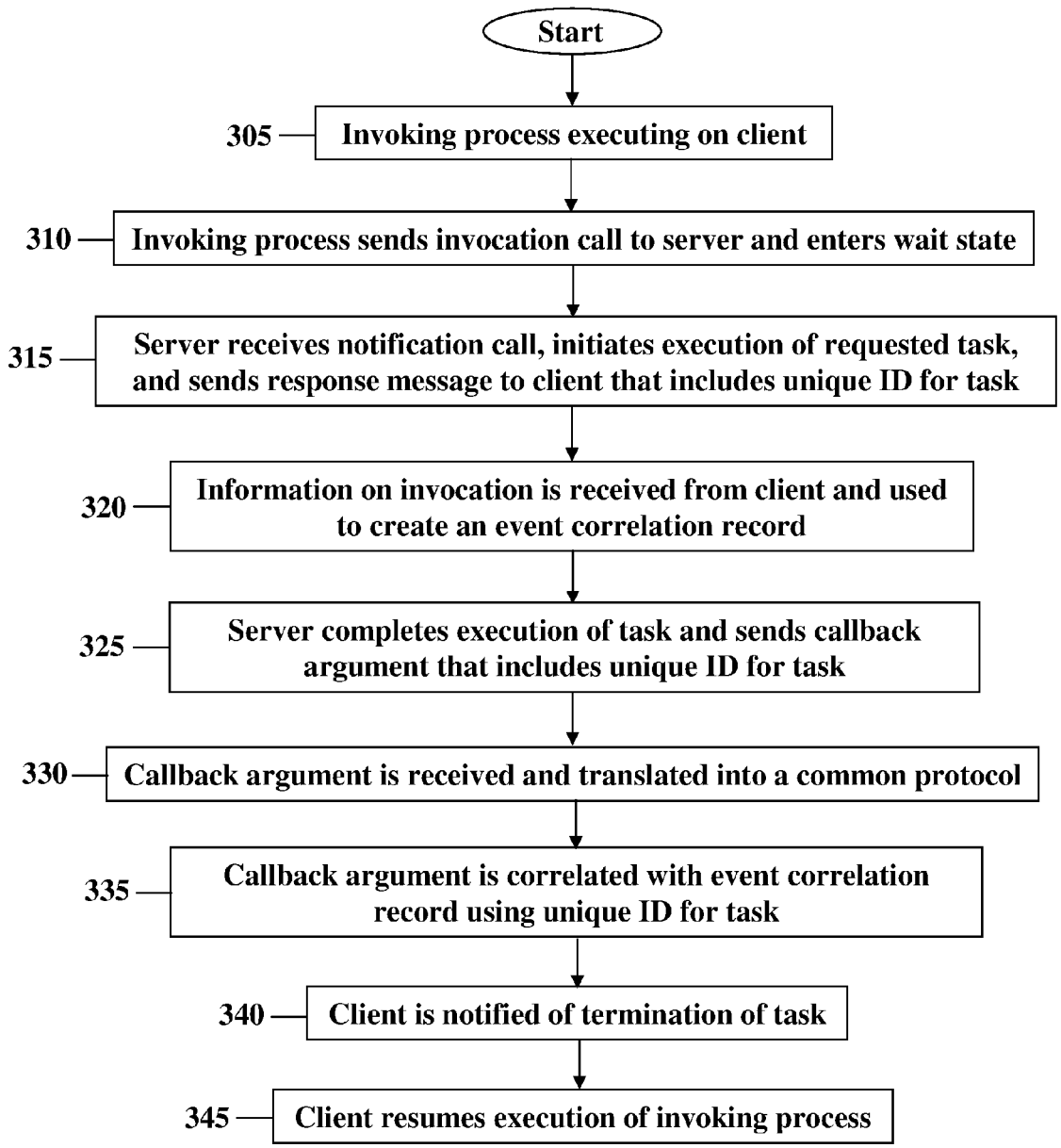
FIG. 3 is a flow diagram illustrating an exemplary embodiment of a process of coupling a task invoked on a server system to the invoking process waiting for completion of the task on a client system by correlating a callback argument sent from the server.

Referring now to FIG. 3, a flow chart illustrating an exemplary embodiment of a process 300 of coupling a task invoked on a server system to the invoking process waiting for completion of the task on a client system by correlating a callback argument sent from the server is provided. In exemplary process 300, at block 305, the invoking process is executing on the client. At block 310, the invoking process sends the invocation call to the server and enters a wait state on the client. At block 315, the server receives the invocation call, sends a response message to the client that the invoked call has been received, and begins executing the invoked task. The response includes a unique identifier generated for the invoked task by the server. At block 320, information on the invoking process, the invoked task, and the unique identifier included in the response from the server is received from the client and used to create an event correlation record for the invoked task in a correlation record data store. At block 325, the server completes execution of the invoked task and sends a callback argument for the task that includes the unique identifier generated for the task. At block 330, the callback argument is translated into a common protocol. At block 335, the callback argument is correlated with the event correlation record for the invoked task according to the unique identifier provided for the task by the server. At block 340, the translated callback argument is provided to the client. At block 345, the client resumes execution of the invoking process.

Figure 4:
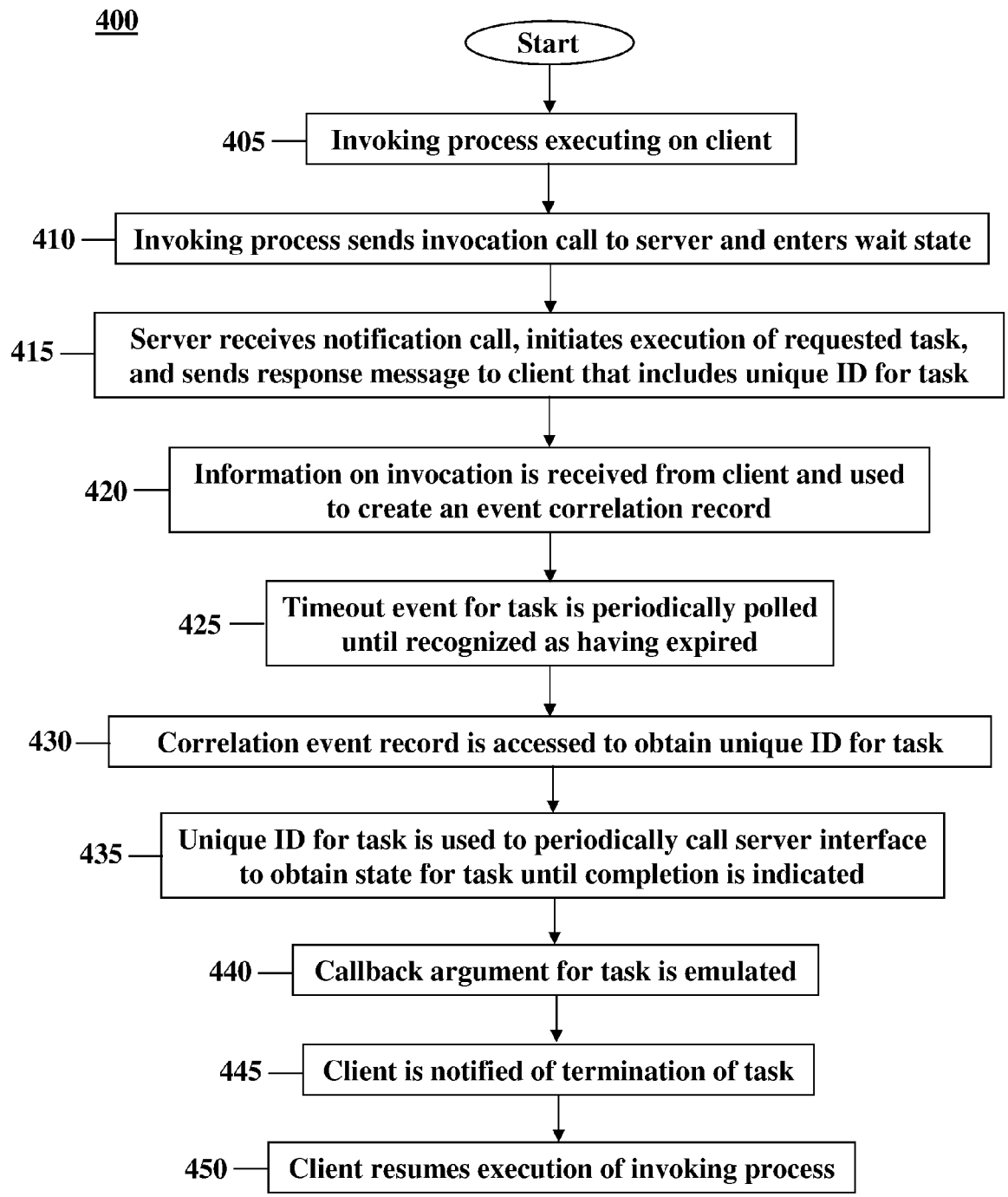
FIG. 4 is a flow diagram illustrating an exemplary embodiment of a process of coupling a task invoked on a server system to the invoking process waiting for completion of the task on a client system by emulating callback argument from the server.

Referring now to FIG. 4, a flow chart illustrating an exemplary embodiment of a process 400 of coupling a task invoked on a server system to the invoking process waiting for completion of the task on a client system by emulating callback argument from the server is provided. Exemplary process 400 can be implemented, for example, in a situation where the server is not configured to provide callback arguments or where callback arguments provided by the server are lost. At block 405 of process 400, the invoking process is executing on the client. At block 410, the invoking process sends the invocation call to the server and enters a wait state on the client. At block 415, the server receives the invocation call, sends a response message to the client that the invoked call has been received, and begins executing the invoked task. The response includes a unique identifier generated for the invoked task by the server. At block 420, information on the invoking process, the invoked task, and the unique identifier included in the response from the server is received from the client and used to create an event correlation record for the invoked task in a correlation record data store. At block 425, a timeout event for the invoked task is periodically polled until it is recognized as having expired. At block 430, the event correlation record for the invoked task is accessed to obtain the unique identifier generated by the server for the task. At block 435, the unique identifier generated by the server is used to periodically call the interface provided by the server to obtain the state information of the invoked task until the state information indicates that the task has completed. At block 440, a callback argument for the task is emulated according to a protocol understood by the invoking client systems. At block 445, the emulated callback argument is provided to the client. At block 450, the client resumes execution of the invoking process.

Figure 5:
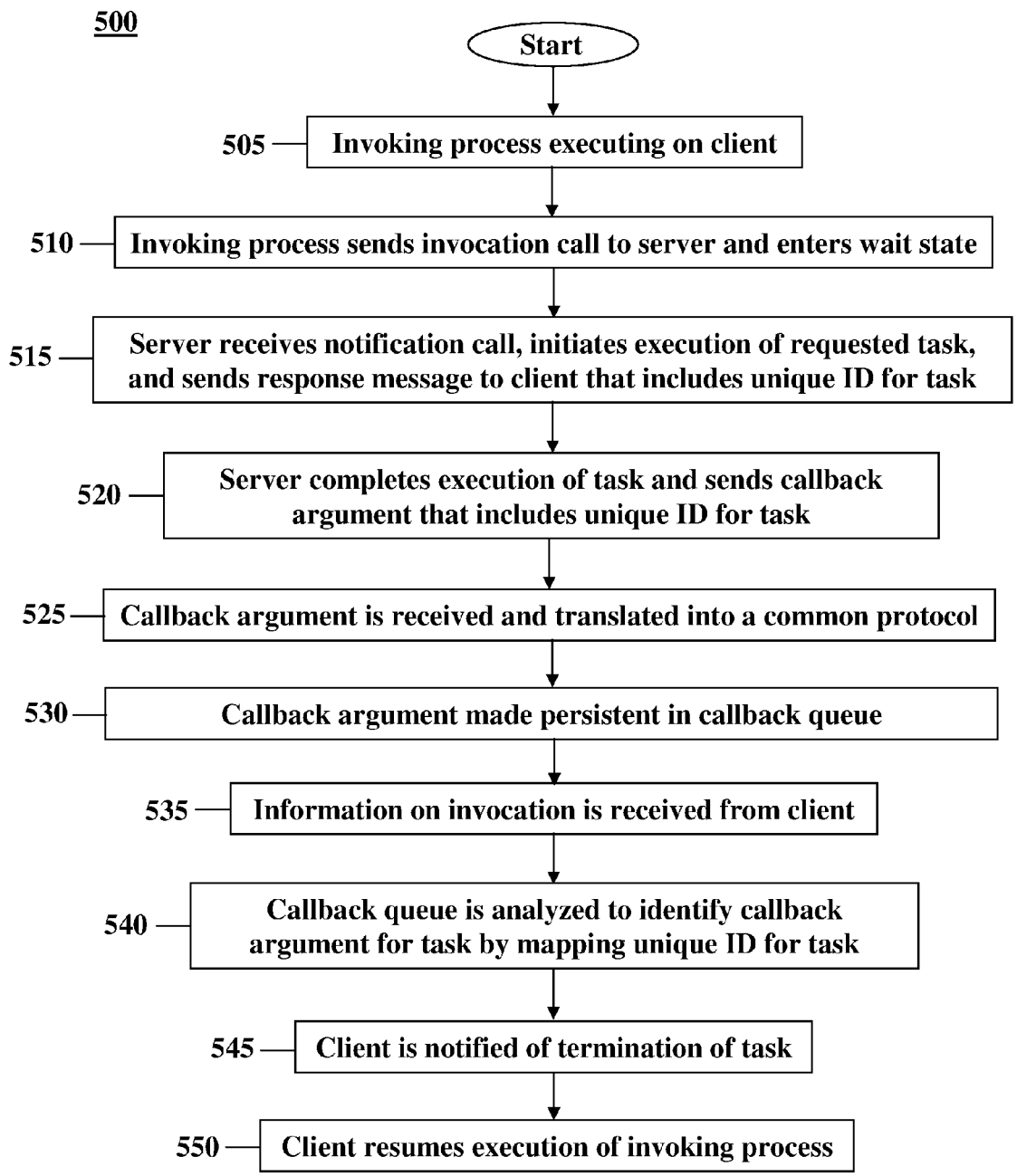
FIG. 5 is a flow diagram illustrating an exemplary embodiment of a process of coupling a task invoked on a server system to the invoking process waiting for completion of the task on a client system by correlating a callback argument sent from the server in a "call before wait" situation.

Referring now to FIG. 5, a flow chart illustrating an exemplary embodiment of a process 500 of coupling a task invoked on a server system to the invoking process waiting for completion of the task on a client system by correlating a callback argument sent from the server in a "call before wait" situation is provided. A call before wait is a race condition that occurs where the server completes the requested task before the client is able to interact with coupling system 100 to add an event correlation record corresponding to the requested task to correlation record data store 112. That is, the server transmits the callback argument providing notification of the completion of the requested task before the client actually "knows" that it is waiting for something (that is, before the event correlation record has been created).

In exemplary process 500, at block 505, the invoking process is executing on the client. At block 510, the invoking process sends the invocation call to the server and enters a wait state on the client. At block 515, the server receives the invocation call, sends a response message to the client that the invoked call has been received, and begins executing the invoked task. The response includes a unique identifier generated for the invoked task by the server. At block 520, the server completes execution of the invoked task and sends a callback argument for the task that includes a unique identifier generated for the invoked task by the server. At block 525, the callback argument is translated into a common protocol. At block 530, the callback argument is made persistent in a callback queue. At block 535, information on the invoking process, the invoked task, and the unique identifier included in the response from the server is received from the client. At block 540, the callback queue is analyzed to identify the callback argument for the invoked task by mapping the unique identifier for the task received at block 535. At block 545, the callback argument is provided to the client. At block 550, the client resumes execution of the invoking process.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

Figure 6:
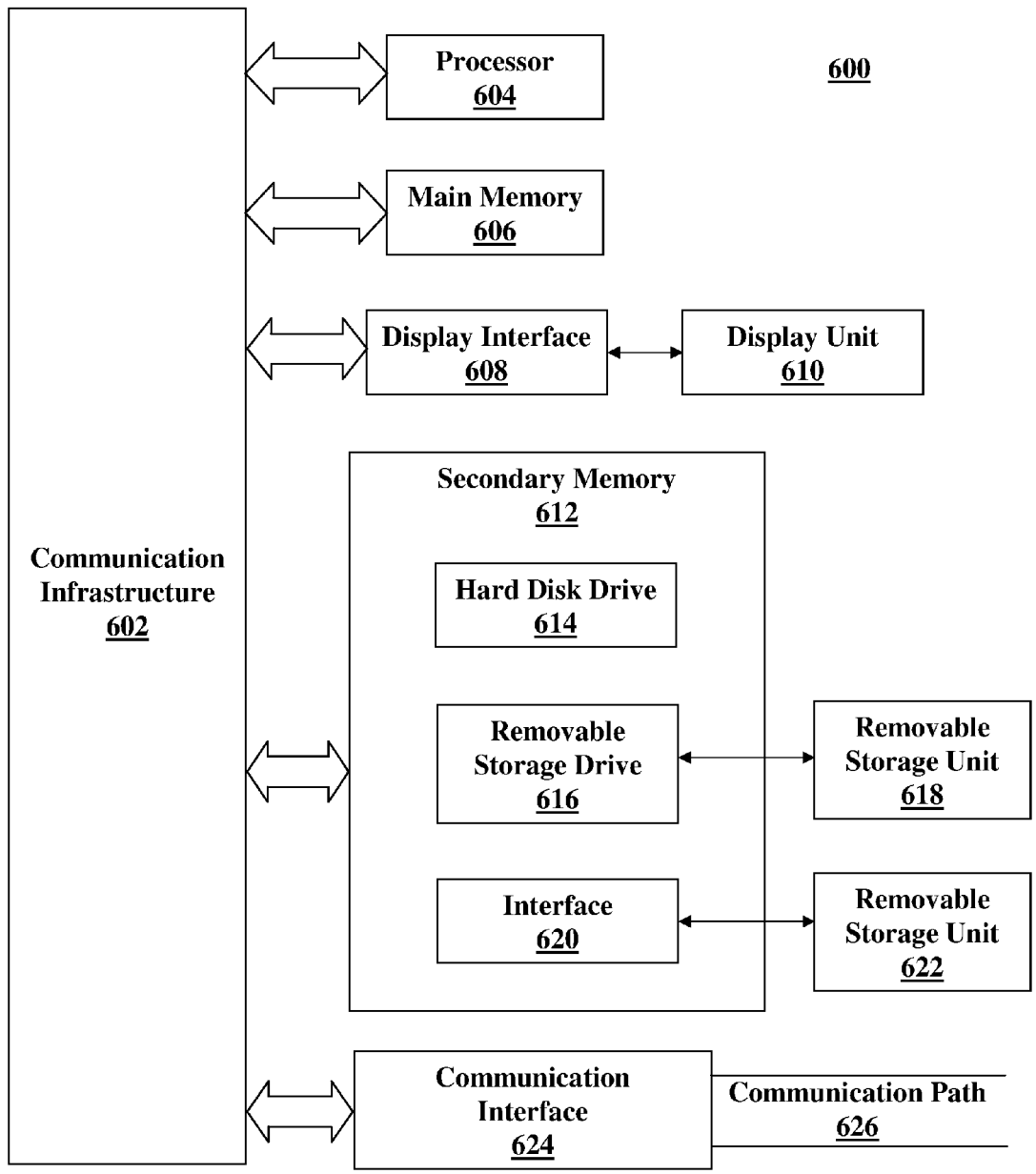
FIG. 6 is a block diagram illustrating an exemplary computer system that can be used for implementing exemplary embodiments of the present invention.

FIG. 6 is a block diagram of an exemplary computer system 600 that can be used for implementing exemplary embodiments of the present invention. Computer system 600 includes one or more processors, such as processor 604. Processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement exemplary embodiments using other computer systems and/or computer architectures.

Exemplary computer system 600 can include a display interface 608 that forwards graphics, text, and other data from the communication infrastructure 602 (or from a frame buffer not shown) for display on a display unit 610. Computer system 600 also includes a main memory 606, which can be random access memory (RAM), and may also include a secondary memory 612. Secondary memory 612 may include, for example, a hard disk drive 614 and/or a removable storage drive 616, representing a floppy disk drive, a magnetic tape drive, an optical disk drive, etc. Removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, removable storage unit 618 includes a computer usable storage medium having stored therein computer software and/or data.

In exemplary embodiments, secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (that is, channel) 626. Channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 606 and/or secondary memory 612. Computer programs may also be received via communications interface 624. Such computer programs, when executed, can enable the computer system to perform the features of exemplary embodiments of the present invention as discussed herein. In particular, the computer programs, when executed, enable processor 604 to perform the features of computer system 600. Accordingly, such computer programs represent controllers of the computer system.

Although exemplary embodiments of the present invention have been described in detail, the disclosure is not intended to be exhaustive or limited to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the various embodiments of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the various embodiments of the present invention.

The invention claimed is:

1. A method of coupling asynchronous process interaction between computer systems integrated within an overall system of interconnected systems, the method comprising:

receiving a set of information describing an invocation call for execution of a first process on a first system integrated within the overall system, a second process executing on a second system integrated within the overall system making the invocation call, the set of information specifying a first unique identifier for the first process generated by the first system and a callback endpoint in the second process implemented to receive notification upon completion of the first process by the first system;

correlating a first callback argument received upon completion of the first process that includes the first unique identifier for the first process with the set of information according to the first unique identifier for the first process;

translating each callback argument received upon completion of each process invoked for execution on each system integrated within the overall system into a corresponding callback record according to a common protocol, further comprising adding each callback record to a callback queue, and wherein each callback record includes a unique identifier generated for the corresponding process sending the callback argument by the system on which the process is invoked for execution; and sending a notification message to the callback endpoint in the second process specified in the set of information indicating completion of the first process;

wherein the set of information describing the invocation call includes a first timeout event for the first process, and wherein, if the first translated callback record is not located in the callback queue upon receiving the set of information, correlating the first callback argument with the set of information comprises periodically scanning the correlation record data store according to the first unique identifier for the first process to determine a status of the first timeout event in the first event correlation record, accessing a first interface mechanism implemented by the first system to periodically poll the first system to receive a current execution state of the first process on the first system according to the first unique identifier for the first process upon the status of the first timeout event being determined to be expired during periodic scanning of the correlation record data store, constructing an emulation of the first callback record for the first process upon the current execution state of the first process being determined to be completed during periodic polling of the first system, and correlating the emulated first callback record with the first event correlation record according to the first unique identifier for the first process.

2. The method of claim 1, wherein correlating the first callback argument with the set of information comprises receiving the first callback argument from the first system upon completion of the first process, translating the first callback argument into a first callback record according to the common protocol, and correlating the first callback record with the set of information according to the first unique identifier for the first process.

3. The method of claim 2, further comprising analyzing the callback queue to attempt locate the first callback record according to the first unique identifier for the first process upon receiving the set of information.

4. The method of claim 3, further comprising creating a first event correlation record for the first process that includes the set of information if the first callback record is not located in the callback queue upon receiving the set of information, and wherein correlating the first callback argument with the set of information comprises correlating the first callback record with the first event correlation record according to the first unique identifier for the first process if the first callback record is not located in the callback queue upon receiving the set of information.

5. The method of claim 4, wherein correlating the first callback argument with the set of information comprises correlating the first callback record with the set of information according to the first unique identifier for the first process upon receiving the set of information if the first callback record is located in the callback queue upon receiving the set of information.

6. The method of claim 4, further comprising storing the first event correlation record in a correlation record data store if the first callback record is not located in the callback queue upon receiving the set of information.

7. The method of claim 1, wherein translating each callback argument sent from each process invoked for execution on each system integrated within the overall system into a callback record according to a common protocol is performed by a callback interface mechanism, wherein the callback interface mechanism is configured to register with each system integrated within the overall system to receive each callback argument sent from each process invoked for execution on each system integrated within the overall system and the unique identifier generated for the corresponding process sending the callback argument by the system on which the process is invoked for execution, and wherein the callback interface mechanism is configured to construct each callback record from the callback argument sent from the corresponding process and the unique identifier generated for the corresponding process sending the callback argument by the system on which the process is invoked for execution.

8. The method of claim 1, wherein the overall system comprises a distributed computing system, and wherein the interconnected systems integrated within the overall system comprises a first set of application servers and a second set of software components.

9. The method of claim 8, wherein the distributed computing system comprises a service-oriented architecture, and wherein the method is implemented within an enterprise service bus incorporated within the service-oriented architecture.

10. A method of coupling asynchronous process interaction between computer systems integrated within an overall system of interconnected systems, the method comprising:

receiving a set of information describing an invocation call for execution of a first process on a first system integrated within the overall system, a second process executing on a second system integrated within the overall system making the invocation call, the set of information specifying a first unique identifier for the first process generated by the first system and a callback endpoint in the second process implemented to receive notification upon completion of the first process by the first system;

correlating a first callback argument received upon completion of the first process that includes the first unique identifier for the first process with the set of information according to the first unique identifier for the first process;

sending a notification message to the callback endpoint in the second process specified in the set of information indicating completion of the first process;

translating each callback argument received upon completion of each process invoked for execution on each system integrated within the overall system into a corresponding callback record according to a common protocol, further comprising adding each callback record to a callback queue, and wherein each callback record includes a unique identifier generated for the corresponding process sending the callback argument by the system on which the process is invoked for execution, wherein correlating the first callback argument with the set of information comprises receiving the first callback argument from the first system upon completion of the first process, translating the first callback argument into a first callback record according to the common protocol, and correlating the first callback record with the set of information according to the first unique identifier for the first process;

analyzing the callback queue to attempt locate the first callback record according to the first unique identifier for the first process upon receiving the set of information;

creating a first event correlation record for the first process that includes the set of information if the first callback record is not located in the callback queue upon receiving the set of information, and wherein correlating the first callback argument with the set of information comprises correlating the first callback record with the first event correlation record according to the first unique identifier for the first process if the first callback record is not located in the callback queue upon receiving the set of information; and storing the first event correlation record in a correlation record data store if the first callback record is not located in the callback queue upon receiving the set of information;

wherein the first system is not implemented to provide the first callback argument upon completion of the first process, and wherein correlating the first callback argument with the first set of information comprises accessing a first interface mechanism implemented by the first system to periodically poll the first system to receive a current execution state of the first process on the first system according to the first unique identifier for the first process, constructing an emulation of the first callback record for the first process upon the current execution state of the first process being determined to be completed during periodic polling of the first system, and correlating the emulated first callback record with the first event correlation record according to the first unique identifier for the first process.

11. The method of claim 10, wherein accessing the first interface mechanism implemented by the first system to periodically poll the first system to receive a current execution state of the first process on the first system according to the first unique identifier for the first process is performed by a polling interface mechanism, and wherein the polling interface mechanism is configured to register with each system integrated within the overall system to access a respective interface mechanism implemented by each system to poll the system to receive a respective current execution state of each process executing on the system according to a respective unique identifier for each process executing on the system.

12. A method of coupling asynchronous process interaction between computer systems integrated within an overall system of interconnected systems, the method comprising:

receiving a set of information describing an invocation call for execution of a first process on a first system integrated within the overall system, a second process executing on a second system integrated within the overall system making the invocation call, the set of information specifying a first unique identifier for the first process generated by the first system and a callback endpoint in the second process implemented to receive notification upon completion of the first process by the first system;

correlating a first callback argument received upon completion of the first process that includes the first unique identifier for the first process with the set of information according to the first unique identifier for the first process;

sending a notification message to the callback endpoint in the second process specified in the set of information indicating completion of the first process;

translating each callback argument received upon completion of each process invoked for execution on each system integrated within the overall system into a corresponding callback record according to a common protocol, further comprising adding each callback record to a callback queue, and wherein each callback record includes a unique identifier generated for the corresponding process sending the callback argument by the system on which the process is invoked for execution, wherein correlating the first callback argument with the set of information comprises receiving the first callback argument from the first system upon completion of the first process, translating the first callback argument into a first callback record according to the common protocol, and correlating the first callback record with the set of information according to the first unique identifier for the first process;

analyzing the callback queue to attempt locate the first callback record according to the first unique identifier for the first process upon receiving the set of information;

creating a first event correlation record for the first process that includes the set of information if the first callback record is not located in the callback queue upon receiving the set of information, and wherein correlating the first callback argument with the set of information comprises correlating the first callback record with the first event correlation record according to the first unique identifier for the first process if the first callback record is not located in the callback queue upon receiving the set of information; and storing the first event correlation record in a correlation record data store if the first callback record is not located in the callback queue upon receiving the set of information;

wherein the correlation record data store is maintained by a process correlation management module, the process correlation management module providing a second interface mechanism accessible to perform a specified set of addition, deletion, and modification operations on event correlation records maintained in the correlation record data store.

13. The method of claim 12, wherein the process correlation management module is configured to register with each system integrated within the overall system to receive a respective set of information from each system describing each invocation call made by each process executing on the system for execution of a respective process on another system integrated within the overall system, and wherein the respective set of information describing each invocation call includes the corresponding unique identifier generated for the respective process called by the invocation call generated by the system called to execute the respective process and a respective callback endpoint in the respective process making the invocation call implemented to receive notification upon completion of the first process by the first system.

14. The method of claim 13, wherein the process correlation management module is configured to analyze the callback queue to attempt locate the respective callback record for the respective process called by each invocation call made by each process executing on the system invoked by each process executing on each system according to the corresponding unique identifier generated for the respective invoked process upon receiving the respective set of information, and wherein the process correlation management module is configured to create a respective event correlation record for each invocation call made by each system integrated within the overall system according to the respective set of information describing the invocation call if the respective callback record for the respective process called by the invocation call is not located in the callback queue upon receiving the respective set of information.

15. The method of claim 14, wherein the process correlation management module is configured to store the respective event correlation record for each invocation call made by each system integrated within the overall system for execution of a respective process on another system integrated within the overall system in the correlation record data store if the respective callback record for the respective process called by the invocation call is not located in the callback queue upon receiving the respective set of information.

16. A non-transitory computer-usable medium having computer readable instructions stored thereon for execution by a processor to perform a method of coupling asynchronous process interaction between computer systems integrated within an overall system of interconnected systems, the method comprising:
    receiving a set of information describing an invocation call for execution of a first process on a first system integrated within the overall system, a second process executing on a second system integrated within the overall system making the invocation call, the set of information specifying a first unique identifier for the first process generated by the first system and a callback endpoint in the second process implemented to receive notification upon completion of the first process by the first system;
    correlating a first callback argument received upon completion of the first process that includes the first unique identifier for the first process with the set of information according to the first unique identifier for the first process;
    translating each callback argument received upon completion of each process invoked for execution on each system integrated within the overall system into a corresponding callback record according to a common protocol, further comprising adding each callback record to a callback queue, and wherein each callback record includes a unique identifier generated for the corresponding process sending the callback argument by the system on which the process is invoked for execution; and
    sending a notification message to the callback endpoint in the second process specified in the set of information indicating completion of the first process;
    wherein the set of information describing the invocation call includes a first timeout event for the first process, and wherein, if the first translated callback record is not located in the callback queue upon receiving the set of information, correlating the first callback argument with the set of information comprises periodically scanning the correlation record data store according to the first unique identifier for the first process to determine a status of the first timeout event in the first event correlation record, accessing a first interface mechanism implemented by the first system to periodically poll the first system to receive a current execution state of the first process on the first system according to the first unique identifier for the first process upon the status of the first timeout event being determined to be expired during periodic scanning of the correlation record data store, constructing an emulation of the first callback record for the first process upon the current execution state of the first process being determined to be completed during periodic polling of the first system, and correlating the emulated first callback record with the first event correlation record according to the first unique identifier for the first process.

17. A data processing system comprising:
    at least one processor;
    a random access memory for storing data and programs for execution by the at least one processor; and
    computer readable instructions stored in the random access memory for execution by the at least one processor to perform a method of coupling asynchronous process interaction between computer systems integrated within an overall system of interconnected systems, the method comprising:
    receiving a set of information describing an invocation call for execution of a first process on a first system integrated within the overall system, a second process executing on a second system integrated within the overall system making the invocation call, the set of information specifying a first unique identifier for the first process generated by the first system and a callback endpoint in the second process implemented to receive notification upon completion of the first process by the first system;
    correlating a first callback argument received upon completion of the first process that includes the first unique identifier for the first process with the set of information according to the first unique identifier for the first process;
    translating each callback argument received upon completion of each process invoked for execution on each system integrated within the overall system into a corresponding callback record according to a common protocol, further comprising adding each callback record to a callback queue, and wherein each callback record includes a unique identifier generated for the corresponding process sending the callback argument by the system on which the process is invoked for execution; and
    sending a notification message to the callback endpoint in the second process specified in the set of information indicating completion of the first process;
    wherein the set of information describing the invocation call includes a first timeout event for the first process, and wherein, if the first translated callback record is not located in the callback queue upon receiving the set of information, correlating the first callback argument with the set of information comprises periodically scanning the correlation record data store according to the first unique identifier for the first process to determine a status of the first timeout event in the first event correlation record, accessing a first interface mechanism implemented by the first system to periodically poll the first system to receive a current execution state of the first process on the first system according to the first unique identifier for the first process upon the status of the first timeout event being determined to be expired during periodic scanning of the correlation record data store, constructing an emulation of the first callback record for the first process upon the current execution state of the first process being determined to be completed during periodic polling of the first system, and correlating the emulated first callback record with the first event correlation record according to the first unique identifier for the first process.

\* \* \* \* \*